United States Patent [19]

Barclay et al.

[11] 4,252,418
[45] Feb. 24, 1981

[54] ELECTROCHROMIC DISPLAY DEVICE

[75] Inventors: Donald J. Barclay, Winchester; Colin L. Bird, Eastleigh; David H. Martin; William M. Morgan, both of Chandlers Ford, all of England

[73] Assignee: International Business Machines Corporation, Armonk, N.Y.

[21] Appl. No.: 953,981

[22] Filed: Oct. 23, 1978

[30] Foreign Application Priority Data

Mar. 31, 1978 [GB] United Kingdom ............... 12585/78

[51] Int. Cl.³ .................................................. G02F 1/17
[52] U.S. Cl. ................................................... 350/357
[58] Field of Search ....................................... 350/357

[56] References Cited

U.S. PATENT DOCUMENTS

| 3,854,794 | 12/1974 | Van Dam et al. | 350/357 |
| 3,950,077 | 4/1976 | Jasinski | 350/357 |

OTHER PUBLICATIONS

Schoot et al., "New Electrochromic Memory Display" Appl. Phys. Lett., vol. 23, No. 2, Jul. 15, 1973, pp. 64–65.

Primary Examiner—James W. Davie
Attorney, Agent, or Firm—Joseph E. Kieninger

[57] ABSTRACT

An electrochromic display device, preferably employing an organic electrochromic material such as heptyl viologen, has display electrodes with a rough surface in contact with the electrochromic material. The device is operated at a sufficiently high current density so that the diffusion depth of the material conforms to the contours of the electrodes.

9 Claims, 3 Drawing Figures

ELECTROCHROMIC DISPLAY DEVICE

DESCRIPTION

1. Technical Field

This invention relates to display devices and more particularly to electrochromic display devices.

It is a primary object of this invention to provide an improved electrochromic display device.

It is another object of this invention to increase the time before undesirable electrochromic material reactions take place after a current is applied to the display electrode.

It is a further object of this invention to provide an electrochromic display device that permits a shorter writing time.

It is yet another object of this invention to increase the take-off time of an electrochromic device.

2. Background Art

An electrochromic display device, for the purposes of this specification, is a display which operates by the reversible deposition of colored species onto display electrodes as the result of redox reactions. The electrolyte may contain organic or inorganic species, and can be colorless or tinted in a color which contrasts with the deposited species.

The basis of operation of an electrochromic display device using an electrolyte containing organic species is the electrochemical and chemical reaction between a suitable cation, $V^{++}$ and an anion $A^-$. Upon reduction of the cation a stable radical is formed:

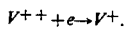

This combines with the anion to precipitate on the cathode (display electrode) to form a film whose resistance depends on the anion:

Of especial interest as cations are the viologens, some of which together with a large number of anions are described and claimed in U.S. Pat. No. 3,854,794. In a paper by Schoot C. J., Ponjee J. J. et al, 1973 J. Appl. Phys. Vol. 23, p. 64, the particular electrolyte studied was diheptylviologen dibromide (N,N'-diheptyl-4,4'-bypyridinium dibromide). On reduction of the viologen, a violet precipitate is formed with the bromide anion at the display electrode. At the anode a reverse reaction occurs. It has been found that the bromide anion corrodes and discolors the metal surface of the display electrode especially when silver, which is a highly preferred metal, is used and repeated reduction/oxidation cycles result in a non-erasible deposit due to recrystallization of the radical cation deposit.

In U.S. Pat. No. 3,950,077 to Raymond J. Jasinski, it is suggested that dihydrogen phosphate ($H_2PO_4^-$) be substituted for the bromide anion. The use of this anion has solved the recrystallization and corrosion problems but the speed of the reactions at the electrodes is substantially reduced.

In copending British Application Ser. No. 45500/77 (UK977018), now U.S. Pat. No. 4,187,003, the use of either or both hypophosphite ($H_2PO_2^-$) and phosphite ($HPO_3^{2-}$) anions is proposed, possibly in combination with bromide anions. The specification of the application indicates that, mixed with dihydrogen phosphate anions, phosphite or hypophosphite anions lead to substantial improvements in the speeds of the reactions at the display electrode, especially in the erasure of the deposited species, when compared with the use of dihydrogen phosphate alone.

However, in one particular aspect, phosphate, phosphite and hypophosphite anions fall short of the performance of bromide anions. A measure of the speed at which a display can be generated (written) is the take-off or transition time of a given electrochromic system. Take-off time is the time period after which, for a given current density at the display electrode and a given bulk concentration of electrochromic material in the electrolyte, undesirable electrochemical reactions occur. A long take-off time is desirable, for it enables more material to be deposited in a single operation. A long take-off time for a given current density also implies that there is opportunity to shorten the writing time by increasing the current density even though this shortens the take-off time. Take-off time is observed by noting the time at which the potential across the display electrode/solution interface rises sharply away from the potential associated with deposition of the viologen cation radical. For the purposes of this specification, we define take-off time as the length of the interval between application of current to the display electrode and the observation of this potential rise. The take-off times for electrochromic materials including hypophosphite, phosphite or phosphate anions fall significantly short of the take-off times of systems including bromide anions.

BRIEF DESCRIPTION OF THE DRAWING

In the accompanying drawing forming a material part of this disclosure.

DISCLOSURE OF INVENTION

Figure 1:
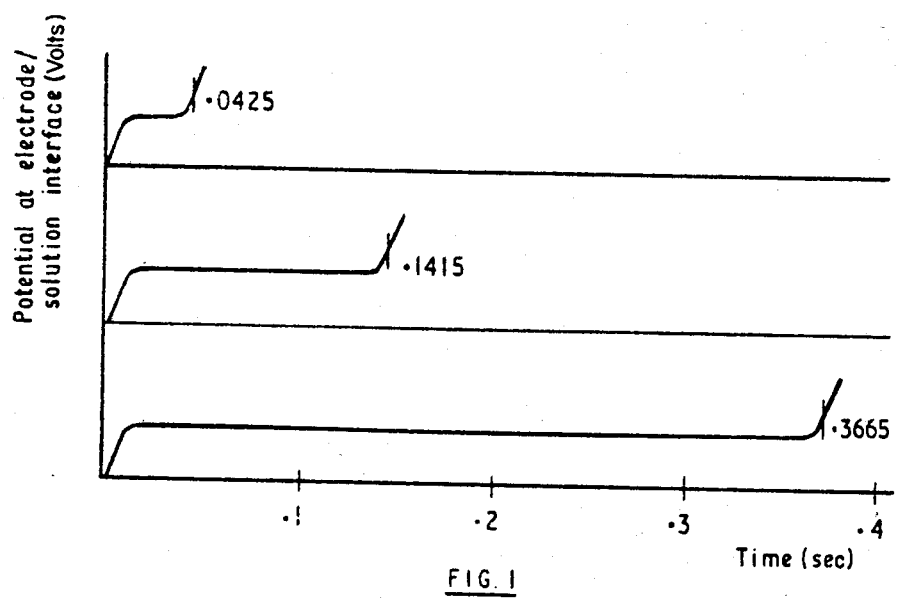
FIG. 1 is a diagram indicating take-off times for different anions.

For a further understanding of the invention and of the objects and advantages thereof, reference will be had to the following description and accompanying drawing, and to the appended claims in which the various novel features of the invention are more particularly set forth.

According to the ivention, a method of operating an electrochromic display device which has one or more display electrodes, each with a rough surface in contact with the active electrochromic material, characterized by supplying to each display electrode at which the display effect is required an electric current at a sufficiently high density such that the bulk concentration interface (Y, FIG. 2) of the electrochromic material conforms to the contours of the rough electrode surface during the deposition of colored species.

Further according to the invention, an electrochromic display device which operates by the reversible reduction/oxidation of an active electrochromic material and which has one or more display electrodes and means to supply current selectively to selected display electrodes, characterized in that each display electrode has a rough surface in contact with the active electrochromic material, and that, in operation of the device, the current density supplied to the display electrodes is sufficiently high so that the bulk concentration interface (Y, FIG. 2) of the electrochromic material conforms to the contour of the rough electrode surface during the deposition of colored species.

BEST MODE FOR CARRYING OUT THE INVENTION

In an electrochromic display device of the kind being considered, the display effect is achieved by depositing a colored species on the display electrode, or, more generally, on display electrodes selected from an array of display electrodes. Usually the array of display electrodes consists of rows and columns of dot shaped electrodes and the display is built up by coloring selected dots. The effectiveness of a display to the viewer resides in the contrast presented to the eye between the colored and uncolored electrodes.

Contrast is most readily achieved by depositing sufficient colored material on the selected electrodes that color saturation occurs. Clearly, it is desirable that this be done as rapidly as possible in order that a display can be changed by the user without undue delay. However, the amount of current which can usefully be supplied to the display electrodes is limited by electrochemical considerations, in particular, the speed at which ions can be supplied from the electrolyte to combine with the electrons supplied at the display electrode. For a current density i, the time interval t during which colored species can be reversibly deposited on the display electrode is normally given by an equation $$t = K/i^2 \qquad (1)$$

where K is a constant term comprising such parameters as the bulk concentration of electrochromic material in the electrolyte and the diffusion coefficient of the material both of which are constant for a given embodiment. Time t is the take-off time, as discussed above. In classical electrochemical systems, take-off time is known as the transition time.

Heptyl viologen dibromide obeys the equation (1). When solutions containing hypophosphite and/or dihydrogen phosphate were studied, it was found that the product $i^2t$ is not always independent of current. It was also found that the take-off times of such solutions were substantially shorter than those of heptyl viologen dibromide.

FIG. 1 shows typical take-off times with smooth display electrodes. For clarity, the three graphs have not been superimposed, but have been placed one above the other. A solution of 0.1 M heptyl viologen was used and i was 20 ma/cm². The bottom graph shows that when 0.5 M Br⁻ was present in the solution, take-off time was 0.366 seconds. When 0.2 M of dihydrogen phosphate, and 2.6 M of hypophosphite replaced the bromide, take-off time dropped to 0.141 seconds. The top graph shows that 0.2 M of dihydrogen phosphate with 1.0 M of hypophosphite gave a take-off time of only 0.042 seconds.

It has been found that a roughened display electrode surface in contact with the electrolyte improves the take-off times when dihydrogen phosphate and/or hypophosphite anions are used with heptyl viologen cations. Our studies have shown that application of the invention extends beyond the use of these materials.

One advantage of the use of rough display electrodes is purely optical and we make no claim to this advantage alone. Very little of the surface observed by the viewer is at right angles to the optical axis (assumed to be perpendicular to the plane of the display device). The deposited colored species is thus observed at a high angle of incidence and a smaller amount of the species need be deposited to achieve color saturation. It is well known that a color observed at a low angle of incidence is lighter than a color observed at a high angle of incidence. Since less colored species needs to be deposited the deposition time is less for a given current density, or, alternatively, the current density required to achieve color saturation in a given time is less. This fact is particularly important when the deposited colored species are highly resistive and it is, in fact, difficult to deposit sufficient species on a smooth electrode to achieve satisfactory contrast.

However, the factor on which the invention is based springs from the observation that the superficial area of a rough electrode is substantially increased relative to that of a smooth electrode and the current density at the surface for a given charge supplied to the electrode is reduced. This immediately leads to an increase of take-off time. However, one other parameter must be taken into account for full advantage to be realized. The active electrochromic material is held in solution in the electrolyte at a bulk concentration C. There is a region between the bulk of the electrolyte and the surface of the electrode in which there is concentration gradient of the electroactive species. The depth of this region is known as the diffusion depth and the diffusion depth before deleterious electrochemical reactions occur is dependent on the diffusion constant of the active electrochromic material and the take-off time. If current density is low, diffusion depth at take-off time is large.

Figure 2:
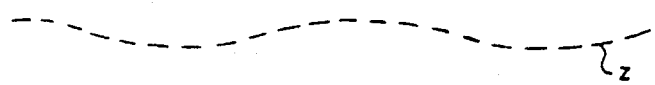
FIG. 2 is a diagrammatic representation of a rough electrode surface in contact with an active electrochromic material.
Figure 2:
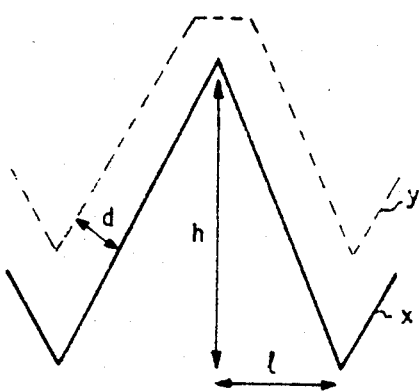

The effect of different diffusion depths with a rough electrode surface is illustrated in FIG. 2. The electrode surface is represented by the thick line X. At higher currents the diffusion depth follows the profile of the electrode surface until take-off time t, as represented by the dotted line Y. At a lower current density the diffusion depth at take-off time is increased and is represented by the dotted line Z. It can intuitively be seen that, for low current densities and bulk concentrations of electrochromic material such that the boundary of the diffusion region (the bulk solution interface) is approximately planar, the roughness of the electrode surface is immaterial and, electrochemically, the electrode behaves as though it were smooth. There still remains, however, the optical advantage associated with a rough surface described above.

The ideal situation is represented by the dotted line Y, where the bulk concentration boundary follows the contours of the rough electrode. In this situation the area of the bulk solution interface interacting with the electrode is the maximum possible. Accordingly, the invention aims at providing a device such that the solution bulk concentration, the diffusion constant, the roughness of the electrode and the current density are chosen such that the situation represented by the dotted line Y occurs.

From these considerations, an estimate of the degree of roughness required for a given active electrochromic material can be derived. It is assumed that the surface comprises contiguous pyramids of height h (FIG. 2) and on square bases of side length 2l. The proportional increase in area of the bulk concentration interface Y (FIG. 2) relative to the base area of the pyramids, i.e. relative to this area of the surface of a smooth electrode is given by $$A = (1+(H/l)^2)^{\frac{1}{2}} - (d/h)^2((1+(h/l)^2)^{\frac{1}{2}} - 1)^3 \quad (2)$$

for $d/h \leq 1/((1+(h/l)^2)^{\frac{1}{2}} - 1)$.

For other values of $d/h$, $A=1$, corresponding to the interface Z of FIG. 2. For a given take-off time, t, $$1 \, d^2 = \pi D t \quad (3)$$

where D is the diffusion coefficient of the electrochromic material.

The total current in the base area is $$i = A \times (FC/2)(\pi D/t)^{\frac{1}{2}} \quad (4)$$

where F is the Faraday and C is the bulk concentration.

It is not proposed to derive the formulae from which these equations come, since they are basic electrochemistry. See, for example, Electrochemical Science by Bockris and Drazic (London 1972) at Chapter 4.

The equation (4) relates take-off time t, base current density i, h, and l.

Figure 3:
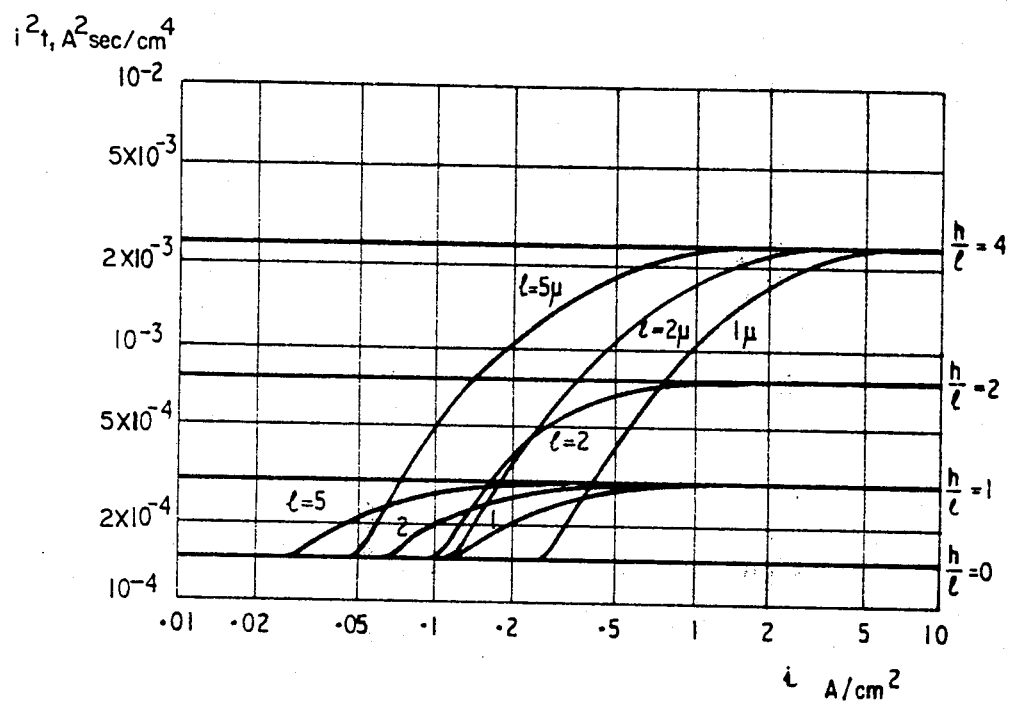
FIG. 3 is a graph on logarithmic indicating the effect of differing roughnesses of the display electrode surface.

As an example of the use of equation (4), FIG. 3 is a plot of $i^2t$ against i for various values of $h/l$ and l, for $D = 2.10^{-6}$ cm$^2$/sec, and $C=0.1$ molar of heptyl viologen. For $h/l = 0$, the surface is smooth and $i^2t$ is independent of i. At low current densities, rough surfaces behave as if smooth because of the large value of the diffusion depth d. When d becomes less than the periodicity of the roughness, 2l, $i^2t$ approaches a high value. The ratio of this value to the smooth surface value gives a take-off time amplification factor, and the square root of the value gives an area amplification or roughness factor.

If, for example, it is required to apply a current of density about 0.6 A/cm$^2$, and $h/l = 4$ then 2l should be greater than $8\mu$ and should certainly be greater than $4\mu$ to maximize the take-off time.

Roughness can be achieved by the method disclosed in United Kingdom Pat. No. 1,522,049 in which an aluminum surface is oxidized, the oxide is removed and then the exposed rough surface is thinly coated with silver. The final coating with silver besides providing a highly desirable electrolyte/electrode interface also serves the purpose of smoothing the peaks left by the roughening. As is well-known, current densities increase substantially at sharp edges and such uneven distribution of charge over the electrode should be avoided.

Any other suitable roughening procedure can be used. The surface of the electrode should preferably be of silver, although gold or platinum are suitable alternatives. Viologen, being surface active, may enhance any corrosive effect of the anions in use, and the use of metals likely to be attacked by the electrolyte should, of course, be avoided.

Our preferred method involves the pulse plating of silver. We have found that satisfactory display electrodes can be plated from an aqueous solution of Silver Thiocyanate 32 g/liter, and Sodium Thiocyanate 200 g/liter. The solution was filtered to remove the minute black particles formed during its make-up. The pH of the solution was 5.4 at 20° C. A suitable rough plated surface was formed by supplying a current density of 5 ma/cm$^2$ by a pulse train of pulse width 0.3 msecs at repetition frequency 1 msec. It was found that the roughness of the surface as measured by the average peak-to-peak distance (2l) was dependent on the temperature of the solution. If solution temperature is above 28° C., the deposit begins to show darker, an undesirable feature. But in the range 20° to 26° C. it was found that the roughness of the surface progressively increased. Variations of pulse width and repetition frequency at constant solution temperature produced no significant variation in the surface roughness.

Electrical circuitry for controlling a display device according to the invention is described in United Kingdom Pat. No. 1,513,999, which is hereby incorporated herein by reference.

INDUSTRIAL APPLICABILITY

Although the invention has been described as applied to an organic electrochromic display device, it is also applicable to display devices using inorganic active electrochromic materials, of which the most frequently proposed are WO$_3$ and MoO$_3$, but which are generally characterized as transition metal compounds which can exist in different stable oxidation states having different electromagnetic absorption characteristics. In such devices diffusion depth is determined by proton concentration.

While we have illustrated and described the preferred embodiment of our invention, it is understood that we do not limit ourselves to the precise constructions herein disclosed and the right is reserved to all changes and modifications coming within the scope of the invention as defined in the appended claims.

We claim:

1. An electrochromic display device comprising
an active electrochromic material which includes heptyl viologen cations and which can undergo a reversible reduction/oxidation reaction, said material having a bulk concentration of 0.1 molar of heptyl viologen,
at least one display electrode having a rough surface thereon in contact with said material wherein a rough surface is defined as an average height to base roughness (h/l, FIG. 2) of 4 and where an average peak-to-peak distance of the protruberances of the rough surface is greater than $4\mu$, and
means to supply current to said electrode to a density such that the bulk concentration interface (Y, FIG. 2) of said material conforms to the contour of the rough surface of said electrode during the deposition of colored species onto said electrode, said current density being 0.6 A/cm$^2$.

2. A method of operating an electrochromic display device comprising the steps of
providing at least one display electrode with a rough surface in contact with the active electrochromic material whereby a rough surface is defined as an average height to base roughness (h/l, FIG. 2) of 4 and where an average peak-to-peak distance of the protruberances of the rough surface is greater than $4\mu$, and
supplying an electric current to said electrode at a density such that the bulk concentration interface (Y, FIG. 2) of the electrochromic material conforms to the contour of the rough surface of said electrode during the deposition of colored species onto said electrode.

3. An electrochromic display device comprising
an active electrochromic material which can undergo a reversible reduction/oxidation reaction,
at least one display electrode having a rough surface thereon in contact with said material wherein a rough surface is defined as an average height to base roughness (h/l, FIG. 2) of 4 and where an average peak-to-peak distance of the protruberances of the rough surface is greater then $4\mu$, and means to supply current to said electrode to a density such that the bulk concentration interface (Y, FIG. 2) of said material conforms to the contour of the rough surface of said electrode during the deposition of colored species onto said electrode.

4. A device as claimed in claim 3, wherein said material is an organic substance.

5. A device as claimed in claim 4 wherein said material includes dihydrogen phosphate anions.

6. A device as claimed in claim 4 wherein said material includes hypophosphite anions.

7. A device as claimed in claim 4 wherein said material includes phosphite anions.

8. A device as claimed in claim 4 wherein said material includes heptyl viologen cations.

9. A device as claimed in claim 8 wherein said material includes bromide anions.

* * * * *